Sept. 4, 1923.

H. N. ATWOOD

PULLEY

Filed April 25, 1922

1,466,869

Inventor

H. N. Atwood.

By Lacey & Lacey, Attorneys

Patented Sept. 4, 1923.

1,466,869

UNITED STATES PATENT OFFICE.

HARRY N. ATWOOD, OF SMITHFIELD, NORTH CAROLINA, ASSIGNOR TO RUBWOOD, INC., OF LAWRENCE, MASSACHUSETTS, A CORPORATION OF MASSACHUSETTS.

PULLEY.

Application filed April 25, 1922. Serial No. 556,370.

*To all whom it may concern:*

Be it known that I, HARRY N. ATWOOD, a citizen of the United States, residing at Smithfield, in the county of Johnston and State of North Carolina, have invented certain new and useful Improvements in Pulleys, of which the following is a specification.

This invention relates to improvements in pulleys and has as one of its objects to provide a pulley so constructed as to insure against slipping of the belt trained thereabout and therefore provide for the more effective and steady transmission of power to the belt or to the pulley, as the case may be.

In order to provide against slippage of pulley belts it has been proposed to provide pulleys with facings of friction material but this has generally been found to be unsatisfactory for various reasons, chief among which is the liability of the facing to be torn loose. The present invention therefore has as another important object to provide a pulley having a face of a character to afford the desired frictional contact with the belt and yet not liable to disintegration as in the case of pulleys having sheets or coverings of friction material.

Another object of the invention is to provide a pulley which will be exceptionally substantial and durable and not liable to become warped, or otherwise distorted.

A pulley constructed in accordance with the present invention is made up of a plurality of plies of fibrous material alternately arranged with plies of friction material, and in one specific embodiment of the invention the first mentioned plies which are indicated by the numeral 1 will be made of veneer, and the other plies which are indicated by the numeral 2 will be made of rubber. In building up the structure the plies are alternately disposed face to face with the veneer plies preferably so arranged that the grain in adjacent plies will run non-parallel, and the assemblage is then subjected to a process of vulcanization by which the plies are intimately bonded into a composite whole. The plies may be variously proportioned as regards their thickness, but they are preferably of substantially uniform diameter so that the peripheries of adjacent plies will be in registration. Therefore in the completed pulley, the circumferential face will comprise the peripheries of the veneer and rubber plies.

It is preferable that veneer be employed in producing the plies 1, although other fibrous material may be found adaptable for the purpose, and it is likewise preferable that rubber be employed in producing the plies 2 as it will serve not only as a frictional material but also as a bonding material. In any event the plies 2, having their peripheries presented at the circumferential face of the pulley, will insure of a maximum degree of frictional contact of the belt with the pulley and, if wear occurs, the effectiveness of the pulley will not be diminished but will maintain throughout the life of the pulley as a whole.

The veneer plies 1 serve of course to impart to the pulley the desired degree of rigidity, and because of the nature of the material of which they are formed, they will not be liable to rapidly wear but will be exceptionally durable and will therefore to a great extent minimize the wear upon the plies 2 which are of a softer material. Furthermore because of the interposition of the friction plies 2 between the relatively durable plies 1, there is little or no likelihood of the peripheral portions of the plies 2 being torn away through contact with the belt.

From the foregoing it will be understood that pulleys of practically any type or design may be constructed in accordance with the principles of the invention and that pulleys so constructed are adapted for useful application. Therefore it will be understood that the drawings are to be taken merely as illustrative of the application of the principles of the invention and it will be evident that pulleys of the solid, split, and other types may be made in accordance therewith in any and all shapes, designs, and sizes.

Figure 1:
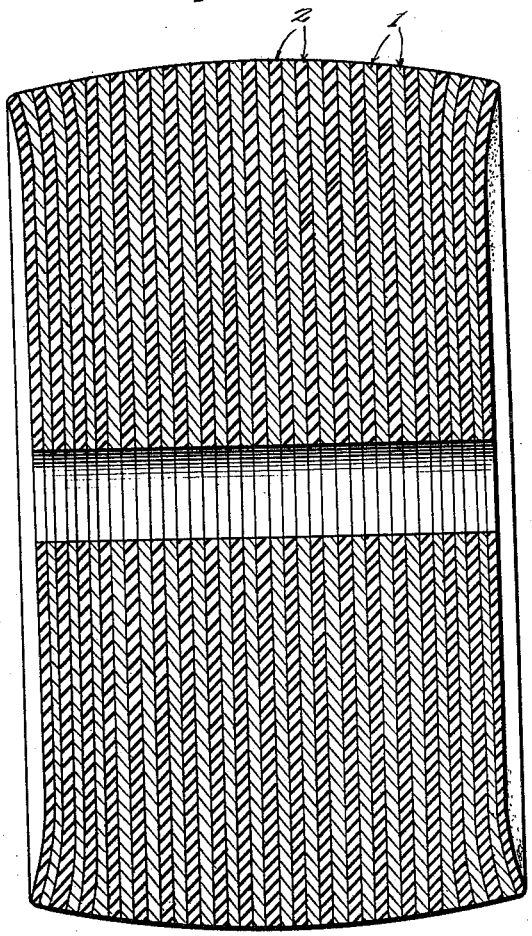
Figure 1 is a diametric sectional view through a pulley constructed in accordance with the present invention.
Figure 2:
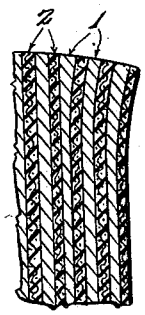
Figure 2 is a fragmentary sectional view illustrating a slight modification of the invention.

In the modified form of the invention shown in Figure 2 of the drawing sheets of foraminous material, such for example as wire mesh indicated by the numeral 3, are embedded in the rubber plies 2 so as to reinforce the structure.

Having thus described the invention what is claimed as new is:

1. A pulley comprising a plurality of plies of veneer and a plurality of bonding plies of elastic friction material alternately arranged and facially united, the latter plies having their peripheries presented at the circumferential face of the pulley and marginally in registration with the veneer plies.

2. A pulley comprising a plurality of plies of veneer and a plurality of bonding plies of rubber alternately arranged and facially united, the latter plies having their peripheries presented at the circumferential face of the pulley.

In testimony whereof I affix my signature.

HARRY N. ATWOOD. [L. S.]